Reissued June 5, 1934 Re. 19,192

UNITED STATES PATENT OFFICE 19,192

PROCESS OF FLOTATION

Ira H. Derby and Orin D. Cunningham, Indianapolis, Ind., assignors to Peter C. Reilly, Indianapolis, Ind.

No Drawing. Original No. 1,812,839, dated June 30, 1931, Serial No. 96,061, March 19, 1926. Application for reissue March 9, 1934, Serial No. 714,884

7 Claims. (Cl. 209—166)

The present invention relates to improvements in ore flotation, including the flotation of sulfide ores, and other metalliferous material, by the use of "nuclear phosphorus compounds" containing sulfur, that is, compounds structurally consisting of atoms and groups of atoms (or radicals) united to one or more phosphorus atoms as a nucleus, which compounds also contain sulfur. The invention is based upon our observation that certain compounds as described herein, which structurally consist of phosphorus as a nucleus to which the other atoms or groups of atoms (radicals) are attached, and which contain sulfur, are excellent flotation agents and constitute a class of compounds that have not heretofore been used in the art of flotation. The present invention is characterized especially by the use of such substances (whether or not they are known per se) as flotation or collecting agents in froth flotation.

More particularly, our present invention embraces ore flotation by the use of products of reaction of phosphorus sulfides (such as the trisulfide, $Pa_2S_3$, or pentasulfide, $Pa_2S_5$), with certain compounds which may be organic or organic-inorganic.

We give the following classification of some of the reactions that yield "nuclear phosphorus compounds" which can conveniently be employed in ore flotation in accordance with the present invention, namely, the reaction of a phosphorus sulfide such as phosphorus pentasulphide, $P_2S_5$, with (*a*) the alkali metal salts or alkaline earth salts of coal tar phenols, such as potassium phenolate or sodium cresylate or the like; (*b*) the alkali or alkaline earth metal salts of alcohols and particularly those mono-hydroxy alcohols containing not more than five carbon atoms, such as sodium ethylate; (*c*) certain aliphatic mercaptols, for example, ethyl mercaptol, or the alkali metal salts of certain mercaptols, such as the sodium or potassium salts of ethyl mercaptol; and (*d*) the aromatic mercaptols, and their alkali metal salts, for example, phenyl mercaptol.

The reactions of the phosphorus sulfides, for example, phosphorus pentasulfide, $P_2S_5$, with the inorganic and organic compounds classified above may result in the formation of a single chemical substance with two or more phosphorus atoms as a nucleus of the molecular structure, or there may be a splitting of the molecule of the phosphorus sulfide compound to yield two or more products each containing one or more nuclear phosphorus atoms, or the reaction may or may not involve the elimination of some of the sulfur of the phosphorus sulfide by the substitution of some other atoms or groups of atoms (radicals), the resulting product or products being characterized, however, by the presence of a nuclear phosphorus atom or atoms in the molecular structure and the presence of sulfur.

These substances have a very high selective action or collecting power for metalliferous materials, such as sulfide minerals, in mineral flotation operations but are lacking in frothing properties so that any appropriate frothing agent (such for example as pine oil or tar acids), should be employed in conjunction therewith in carrying out the flotation operation. It is not necessary that chemically pure substances be used since the unrefined products can be employed with metallurgical results equally good to those obtained with pure substances.

The phosphosulfo compounds above referred to can be used either alone or mixed with other oily materials having flotation value, or with solvent agents or mixtures of the same.

Generally stated it is sufficient to select the desired organic compound of the above classification, and to react thereupon with phosphorus pentasulfide or other sulfide of phosphorus, or even with a mixture of phosphorus and sulfur, the reaction being performed in a suitable container, and at a temperature sufficiently high to cause reaction to take place. In many cases it has been found advisable to employ a mixture of said organic compounds, some of which apparently function as solvents, and may also function as both solvents and reacting materials, including alcohols and tar acids.

For the preparation of the phosphosulfo compounds referred to we give the following specific examples:—

(1) The reaction of sodium alcoholate, for example, with phosphorus pentasulfide, $P_2S_5$, is preferably carried out in some organic solvent such as alcohol which later may be recovered by distillation. A suitable amount, say one part, of anhydrous sodium alcoholate is dissolved in about 5 parts of anhydrous ethyl alcohol to which is then slowly added with stirring 3.5 parts of $P_2S_5$, the temperature of the reaction mixture being maintained at 50° C., or thereabout until all of the $P_2S_5$ has entered into reaction. The reaction product at room temperature is a clear syrupy liquid. Compounds of the type sodium phenolate also react with phosphorus pentasulfide similarly to sodium alcoholate.

(2) One part of powdered phosphorus pentasulfide and about three parts of benzyl mercaptan are mixed together and heated at 115–125° C., or thereabout, with constant stirring, until the reaction is complete as evidenced by the disappearance of the solid phosphorus pentasulfide, or by the evolution of an amount of hydrogen sulfide equivalent to one molecule per molecule of phosphorus pentasulfide used. The reaction product is a clear syrupy liquid.

Other mercaptans may be reacted with phosphorus pentasulfide in a similar manner, for example about three parts of n-amyl mercaptan and one part of phosphorus pentasulfide at 115° C., or thereabout, readily combine to form a syrupy liquid product, hydrogen sulfide being a by-product of the reaction.

The alkali mercaptans, like the alkali alcoholates, combine with phosphorus pentasulfide.

It is known that mercaptans of themselves are flotation reagents, but by their chemical combination with phosphorus pentasulfide their flotation activity is increased.

In most of the examples given herein, pure chemicals were used, but crude chemicals may be used with equally good results, except that it is preferable to use anhydrous materials for the reactions of phosphorus pentasulfide with organic substances.

In the examples herein given, we do not limit our claims to the quantities of reacting substances herein named.

The general procedure indicated in the above examples may be applied in chemically combining phosphorus pentasulfide with any of the compounds included in the classification outlined in the early part of this specification. In some instances heat may have to be applied to bring about the desired chemical combination, and in other cases the reaction mixture may desirably be cooled to carry on the reaction in the cold.

Phosphorus trisulfide may be used instead of the pentasulfide in the examples given, this being employed in an equimolecular proportion under very much the same reaction conditions.

It is preferable not to separate the reaction products in the above examples from the solvents but to use the products in their initial or unrefined condition. In most cases they are sufficiently soluble in water so that in the flotation operation they are quickly dispersed as an aqueous solution throughout the pulp.

The products obtained by the reaction of certain organic and organic-inorganic substances with phosphorus pentasulfide, as illustrated in the above examples, were employed in the flotation of a copper sulfide ore slime of the Utah Copper Company containing some copper oxides and analyzing about 0.9% copper, in the ratio of one tenth pound of product per ton of dry ore, with tar acids as a frothing agent and a lime circuit being employed in conjunction therewith. The ore was subjected to the ordinary flotation operation in the mechanical agitation type of flotation machine and a tailing analyzing 0.06% copper was obtained, together with a high grade concentrate analyzing about 20% copper, corresponding to a recovery of about 95% of the copper value in the ore under treatment.

In other examples we have used both smaller and larger amounts of phosphosulfo compounds, in the flotation of ores, with satisfactory results, and we have also used phosphosulfo compounds both alone and with other flotation agents, with very satisfactory results. Furthermore, we do not limit our conditions for carrying out a flotation operation to those included in the above examples, but may use any type of flotation machine, as for example, the Callow cell, or, instead of an alkaline circuit, we may use a normal or acid circuit.

In the above specification we have referred to the use of alcohol, such as ethyl alcohol. It is to be understood that other alcohols or mixtures thereof, such as denatured alcohol, methyl, propyl alcohol and higher alcohols can be likewise employed. We have also referred to alcoholates and may use the alcoholates produced from methyl alcohol, ethyl alcohol, propyl alcohol or some higher alcohols, or mixtures thereof, such as denatured alcohols. The alcoholates containing more than five carbon atoms are not as suitable.

In several of the above examples we have referred to alkali metal salts, as constituting the flotation agent or substance used in the preparation thereof. We desire it understood that while we have secured satisfactory results with the alkali metal salts, other salts such as the alkaline earth metal salts, (especially the salts of sodium, potassium, and calcium) can also be employed so far as these are soluble in oil or water or emulsions thereof. The procedure for making the alkaline earth metal salts, etc., will be obvious from the above disclosure.

The compounds formed according to the above specification involving, for example, the use of sodium alcoholate and sodium phenolate, etc., may be described as the alkali and alkaline earth metal salts of the organic thiophosphoric acid compounds of the substances herein classified, to wit:—alcohols, phenols and mercaptolic substances.

In the present case we have described the use of phenolates, alcoholates, and mercaptolic substances, as substances to react with phosphorus sulphides to form a flotation reagent. We have given several examples of such phenolates, etc., which are operative for the purpose, and we believe that certain closely related phenolates, etc., can be used, though there are others that will not serve. The expressions "phenolates", etc., as used in this case are accordingly to be construed as covering the examples given herein and products so closely related thereto as to function in a like manner.

What is claimed is:

1. A process which comprises reacting on a mercaptolic substance with a phosphorus sulfide to form a reagent having collecting power in ore flotation.

2. A process which comprises the froth flotation of metalliferous material in the presence of a reaction product of a mercaptol with a phosphorus sulfide and a frothing agent.

3. In the art of froth flotation, the step of floating material to be concentrated in the presence of the herein described flotation agent which comprises a reaction product of a phosphorus-sulfur compound with a substance selected from the herein described group consisting of (*a*) alkali and alkaline earth phenolates, (*b*) alkali and alkaline earth alcoholates, in the presence of a solvent, and (*c*) mercaptolic substances.

4. A process which comprises froth-flotation while in the presence of the herein described flotation reagent which is a reaction product of a phosphorus-sulfur compound and an alkali metal salt of a phenol in the presence of tar acids.

5. A process which comprises froth-flotation while in the presence of the herein described flotation reagent which is a reaction product of a phosphorus-sulfur compound and a sodium alcoholate in the presence of alcohol.

6. A process which comprises froth-flotation while in the presence of the herein described flotation reagent which is a reaction product of a phosphorus-sulfur compound and a sodium alcoholate formed at above normal room temperature in the presence of alcohol.

7. A process which comprises froth-flotation while in the presence of the herein described flotation reagent which is a reaction product of a phosphorus-sulfur compound and an organic-inorganic substance selected from the herein described group consisting of alkali and alkaline earth metal phenolates and alkali and alkaline earth metal alcoholates in the presence of a solvent.

IRA H. DERBY.
ORIN D. CUNNINGHAM.